United States Patent
Morisaki

[15] 3,705,450
[45] Dec. 12, 1972

[54] BEARING MATERIAL

[72] Inventor: Nobukazu Morisaki, Aichi-ken, Japan

[73] Assignee: Daido Metal Company Ltd., Nagoya, Japan

[22] Filed: July 16, 1971

[21] Appl. No.: 163,250

[30] Foreign Application Priority Data

Oct. 27, 1970 Japan..................45/94498

[52] U.S. Cl..................29/182.3, 29/195, 75/208 R, 252/12
[51] Int. Cl..................B22f 7/00
[58] Field of Search............75/208 R; 29/182.3, 195; 252/12

[56] References Cited

UNITED STATES PATENTS

| | | | |
|---|---|---|---|
| 3,553,806 | 1/1971 | Turk et al. | 75/208 R |
| 3,518,186 | 6/1970 | Andrews et al. | 252/12 |
| 3,461,069 | 8/1969 | Waldhuter et al. | 252/12 |
| 3,305,325 | 2/1967 | Brasse et al. | 29/182.3 |
| 3,234,128 | 2/1966 | McLeish et al. | 252/12 |
| 3,218,255 | 11/1965 | Pratt | 252/12 |
| 3,142,559 | 7/1964 | Rup et al. | 29/182.3 X |
| 3,145,101 | 8/1964 | Franssen | 29/182.3 X |
| 3,122,505 | 2/1964 | Rulon-Miller et al. | 252/12 |
| 3,081,196 | 3/1963 | MacDonald | 252/12 |
| 2,995,462 | 8/1961 | Mitchell et al. | 252/12 X |
| 2,689,380 | 9/1954 | Tait | 75/208 R X |
| 2,191,460 | 2/1940 | Fisher | 75/208 R X |

FOREIGN PATENTS OR APPLICATIONS

| | | | |
|---|---|---|---|
| 705,005 | 3/1954 | Great Britain | 75/208 R |
| 657,085 | 9/1951 | Great Britain | 75/208 R |

*Primary Examiner*—Carl D. Quarforth
*Assistant Examiner*—R. E. Schafer
*Attorney*—Karl W. Flocks

[57] ABSTRACT

A bearing material comprising a steel back metal, a porous layer of sintered copper or copper alloy, and a layer of an impregnated and sintered mixture filling the voids of said porous layer and forming a surface layer of the bearing material, said sintered mixture consisting of polytetrafluoroethylene, lead or lead oxide and graphite or a mixture of PTFE, lead fluoride and graphite.

2 Claims, 4 Drawing Figures

E
D
C
B
A

E
D
C
B
A

BEARING MATERIAL

This invention relates to a completely oilless bearing material having low friction coefficient and excellent wear resistance.

The bearing material according to the invention comprises a steel back metal, a porous layer of sintered bronze formed on the surface of said steel back metal, and a layer of a mixture of polytetrafluoroethylene (hereinafter abbreviated as PTFE), lead or lead oxide and graphite or a mixture of PTFE, lead fluoride ($PbF_2$) and graphite applied to the surface of said porous layer in the form of paste and then sintered thereon. It will be obvious that a conventionally used solid lubricant, such as molybdenum disulfide ($MOS_2$) or tungsten disulfide ($WS_2$) which have been commonly used with good results in various fields of industry, can be used instead of graphite and pure copper or copper alloys can be used instead of bronze, in the subject bearing material.

Figure 1:
Figure 2:
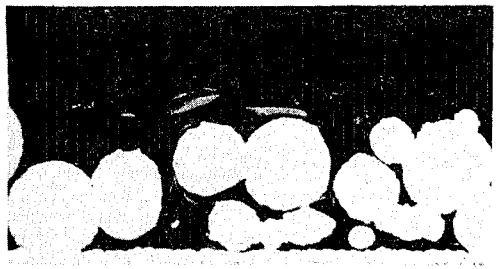
Figure 3:
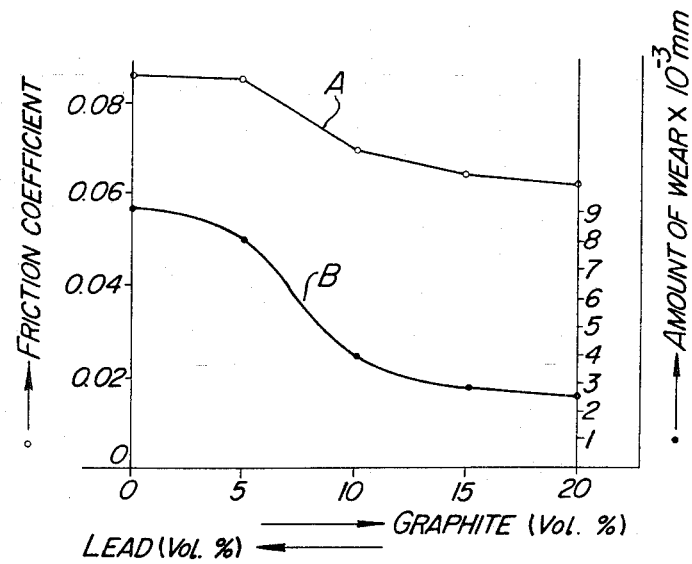
Figure 4:
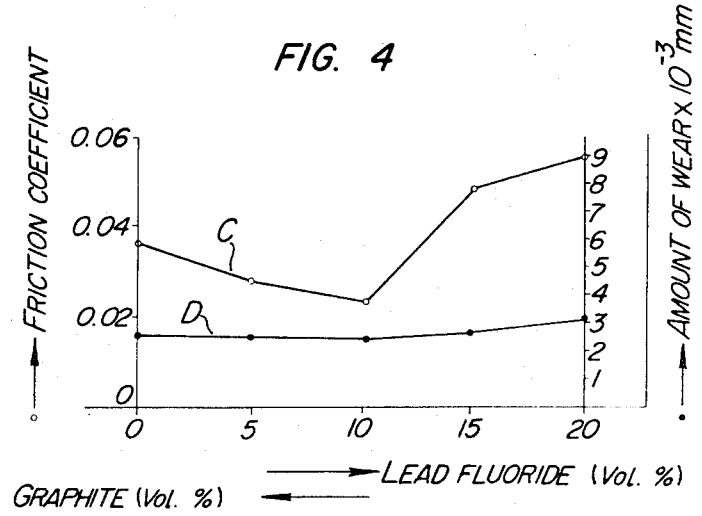

Now, the structure and the performances test results of the bearing according to the present invention will be described by way of example with reference to the accompanying drawing. In the drawing, FIGS. 1 and 2 are 100× optical microphotographic pictures pictures respectively showing the structures of the bearing materials according to the present invention; and FIGS. 3 and 4 are graphic representations respectively showing the results of the frictional abrasion tests conducted on the respective bearing materials. Referring to FIGS. 1 and 2, reference symbol A designates a steel back metal layer (a low carbon steel containing about 0.1 percent C), B a copper plating layer formed on the surface of said steel back metal layer, C a porous layer of sintered bronze overlaying said layer B (in practice, the interspace of the white spherical bronze is filled with a black-colored filling material which is a mixture consisting of 80 percent by volume of PTFE and 20 percent by volume of graphite in FIG. 1 or a mixture consisting of 80 percent by volume of PTFE, 10 percent by volume of lead fluoride and 10 percent by volume of graphite in FIG. 2), D a surface layer of the same material as the aforesaid black-colored filling material, and E a resin layer which is usually used in the optical microphotographic inspection of metal structures. FIG. 3 is a diagram graphically showing the relationships between the friction coefficient and the amount of wear, and the concentrations of graphite and lead in the filling material and the surface layer which are 20 percent by volume in total of said filling material and surface layer. It will be understood from this diagram that the wear resistance (a curve B) and the friction coefficient (a curve A) are improved as the concentration of graphite increases. The results of a number of experiments have revealed that the best result can be obtained when the filling material and the surface layer is composed of 3–30 percent by volume of graphite, 0–25 percent by volume of lead or lead oxide and the remainder of PTFE, the total amount of graphite and lead or lead oxide being 3–40 percent by volume. It has been confirmed that a total amount of these ingredients exceeding 40 percent by volume will result in insufficient bonding strength between copper or copper alloy and the filling material, and hence a degradation of performance of the product bearing.

FIG. 4 is a diagram graphically showing the relationships between the friction coefficient and the amount of wear, and the concentrations of graphite and lead fluoride in the filling material and the surface layer consisting of a mixture of PTFE, lead fluoride and graphite, the total amount of said graphite and lead fluoride being 20 percent by volume. From this diagram, it will be seen that when the filling material and surface layer consist of a mixture 80 percent by volume of PTFE, 10 by volume of lead fluoride and 10 percent by volume of graphite, the friction coefficient (a curve C) of said filling material and surface layer is lowest and the amount of wear (a curve D) thereof tends to become somewhat smaller than the other compositions, though not substantially different from that of the latter. Based on the above experimental results, the best result can be obtained when the filling material and the surface layer is composed of 3–30 percent by volume of lead fluoride, 0–30 percent by volume of graphite and the remainder of PTFE, the total amount of graphite and lead fluoride being 3–40 percent by volume. It has been confirmed that a total amount of these ingredients exceeding 40 percent by volume will result in an insufficient bonding strength between copper or copper alloy and the filling material, and hence a degradation of performance of the product bearing.

The testing conditions employed in FIGS. 3 and 4 are as follows:

| Tester: | Suzuki's frictional abrasion tester |
|---|---|
| Friction velocity: | 0.036 m/min |
| Pressure applied: | 100 kg/cm² |
| Test period: | 60 min |
| Lubrication: | none |
| temperature | Room temperature |

The purity and grain size (mesh) of the graphite used are about 84 percent and 600 mesh respectively in FIG. 3 and about 95.5 percent and 280 mesh respectively in FIG. 4. The thickness of the surface layer is 0.05 mm in FIG. 3 and 0.02–0.03 mm in FIG. 4.

Thus, it will be understood that a slight difference occurs in the experimental result depending upon the quality of graphite and the thickness of the surface layer. For instance, while the friction coefficient of the surface layer of the material of FIG. 3 represented by the curve A should theoretically be the same as that of the surface layer of the material of FIG. 4 represented by the curve C, at the point where the concentration of PTFE is 80 percent by volume and that of graphite is 20 percent by volume, there is in practice a slight difference therebetween. This may be attributable mainly to the difference in thickness of the surface layer and the difference in quality of graphite, particularly to the difference in quality of graphite, although such difference probably involves a minor measuring error.

As described hereinabove, the bearing material of the invention is an excellent completely oilless bearing material having both low friction coefficient and high wear resistance which are most essential for the performance of product bearings.

I claim:
1. A bearing material comprising a back metal consisting of a band steel, a porous layer of sintered copper or copper alloy overlying said back metal, and a layer of a sintered mixture filling the voids of said porous layer and forming a surface layer of the bearing material, said sintered mixture consisting of 3–30 percent by volume of graphite, 0–25 percent by volume of lead or lead oxide and the remainder of substantially polytetrafluoroethylene, and the total amount of said graphite and said lead or lead oxide being 3–40 percent by volume.

2. A bearing material comprising a back metal consisting of a band steel, a porous layer of sintered copper or copper alloy overlying said back metal, and a layer of sintered mixture filling the voids of said porous layer and forming a surface layer of the bearing material, said sintered mixture consisting of 3–30 percent by volume of lead fluoride, 0–30 percent of graphite and the remainder of substantially polytetrafluoroethylene, and the total amount of said lead fluoride and said graphite being 3–40 percent by volume.

* * * * *